US012752350B2

(12) United States Patent
Lee et al.

(10) Patent No.: US 12,752,350 B2
(45) Date of Patent: Oct. 6, 2026

(54) CUTTING INSERT AND CUTTING TOOL ON WHICH SAME IS MOUNTED

(71) Applicant: KORLOY INC., Seoul (KR)

(72) Inventors: Nam Seon Lee, Cheongju-si (KR); Min Seok Oh, Cheongju-si (KR); Young Heum Kim, Cheongju-si (KR)

(73) Assignee: KORLOY INC., Seoul (KR)

( * ) Notice: Subject to any disclaimer, the term of this patent is extended or adjusted under 35 U.S.C. 154(b) by 309 days.

(21) Appl. No.: 18/708,143

(22) PCT Filed: Sep. 8, 2022

(86) PCT No.: PCT/KR2022/013500

§ 371 (c)(1),
(2) Date: May 7, 2024

(87) PCT Pub. No.: WO2023/120868

PCT Pub. Date: Jun. 29, 2023

(65) Prior Publication Data

US 2026/0166635 A1 Jun. 18, 2026

(30) Foreign Application Priority Data

Dec. 22, 2021 (KR) ........................ 10-2021-0185300

(51) Int. Cl.
*B23C 5/20* (2006.01)

(52) U.S. Cl.
CPC .......... *B23C 5/202* (2013.01); *B23C 2200/08* (2013.01); *B23C 2200/20* (2013.01); *B23C 2200/287* (2022.02)

(58) Field of Classification Search
CPC ................ B23C 5/202; B23C 2200/20; B23C 2200/287
See application file for complete search history.

(56) References Cited

U.S. PATENT DOCUMENTS 8,202,026 B2 * 6/2012 Satran ..................... B23C 5/202 407/42

FOREIGN PATENT DOCUMENTS

| | | | | | |
|---|---|---|---|---|---|
| KR | 10-2014-0004149 A | | 1/2014 | | |
| KR | 101720377 B1 | * | 3/2017 | ............. | B23C 5/202 |
| KR | 102144905 B1 | * | 8/2020 | ............. | B23C 5/205 |
| KR | 20210141534 A | * | 11/2021 | ............. | B23C 5/202 |
| WO | WO-2009075634 A1 | * | 6/2009 | ............. | B23C 5/202 |
| WO | WO-2021085826 A1 | * | 5/2021 | ........... | B23C 5/2213 |

* cited by examiner

*Primary Examiner* — Jacob J Cigna
(74) *Attorney, Agent, or Firm* — Rabin & Berdo, P.C.

(57) ABSTRACT

A cutting insert comprises four rectangular upper surfaces extending between two opposing side surfaces, and cutting edge portions formed where the side surfaces and the upper surfaces are connected. The cutting edge portions comprise a second main cutting edge formed on the long sides of the upper surfaces and a first main cutting edge connected to the second main cutting edge. The side surfaces comprise a second main cutting edge clearance surface connected to the second main cutting edge and a first main cutting edge clearance surface connected to the first main cutting edge. An angle formed by an extension line of the first main cutting edge and an extension line of the side flat surface is greater than or equal to an angle formed by an extension line of a boundary line of the first main cutting edge clearance surface and an extension line of the side flat surface.

6 Claims, 13 Drawing Sheets

CUTTING INSERT AND CUTTING TOOL ON WHICH SAME IS MOUNTED

TECHNICAL FIELD

The present disclosure relates to a cutting insert and a cutting tool on which the cutting insert is mounted.

BACKGROUND ART

Generally, a cutting insert is mounted to a cutting tool mounted to a machine tool and used for cutting a workpiece such as a machine part and so on that is made of iron, non-ferrous metal, non-metal material, and so on.

The cutting insert includes an upper surface, a lower surface facing the opposite direction, side surfaces connecting the upper surface and the lower surface, and cutting edges forming boundaries between the upper surface and the side surfaces and cutting the workpiece.

Meanwhile, FIGS. 11 to 13 illustrate a cutting insert disclosed in Korean Patent Publication No. 2014-0004149. For reference, FIGS. 11, 12, and 13 correspond to FIGS. 1, 2, and 4 of the Korean Patent mentioned above, respectively.

The related cutting insert has a sub cutting edge, a corner cutting edge, and a main cutting edge, and the main cutting edge has a first main cutting edge section and a second main cutting edge section. In addition, the corner cutting edge is curved with a predetermined radius of curvature, and there is a corner relief surface provided in relation to the corner cutting edge. In addition, the corner relief surface is curved and extends between a main relief surface and a sub relief surface.

Meanwhile, due to the configuration described above, the related cutting insert has the second main cutting edge section set at a negative (−) axial rake angle, and the cutting insert tilting forward (to the left in FIG. 12) to ensure the margin angle with the bottom surface of the workpiece, and accordingly, machining the workpiece to the second main cutting edge section beyond the first main cutting edge section set at a positive axial rake angle will result in the workpiece being machined into an undesired shape.

In addition, machining at right angles in multiple stages will involve the end of the corner relief surface associated with the corner cutting edge participating in machining, and because it protrudes farther than the first main cutting edge section (in the left direction based on FIG. 12), there is a problem of having to machine the workpiece again or interference with the workpiece.

DETAILED DESCRIPTION OF INVENTION

Technical Problem

In order to solve the above and other problems, an object of the present disclosure is to provide a cutting insert for rectangular machining, in which the cutting insert implements eight corners and is still capable of performing stable multi-stage rectangular machining without re-machining a workpiece.

Technical Solution

In order to achieve the objects described above, a cutting insert according to an embodiment of the present disclosure is a cutting insert for right-angled machining, which may include two opposing side surfaces, four rectangular upper surfaces extending between the two side surfaces, a fastening hole penetrating the two side surfaces, and cutting edge portions formed at positions where the side surfaces and the upper surfaces are connected to each other, in which the cutting insert may be 180° rotationally symmetric about a virtual center line passing through a center of the fastening hole, and 180° rotationally symmetric about a virtual center line passing through a center of the upper surfaces, the cutting edge portions may include a second main cutting edge formed on long sides of the upper surfaces, a first main cutting edge connected to the second main cutting edge at an angle, a corner cutting edge connected to the first main cutting edge, and a sub cutting edge formed on short sides of the upper surfaces and connected to the corner cutting edge, a side flat surface surrounding the fastening hole, a second main cutting edge clearance surface extending from the side flat surface and connected to the second main cutting edge, and a first main cutting edge clearance surface extending from the side flat surface and connected to the first main cutting edge, and connected to the second main cutting edge clearance surface at an angle, and when viewed from the upper surfaces, an angle formed by an extension line of the first main cutting edge and an extension line of the side flat surface may be greater than or equal to an angle formed by an extension line of a boundary line of the first main cutting edge clearance surface and an extension line of the side flat surface.

In addition, the first main cutting edge may be a straight line, and the first main cutting edge clearance surface may include a single plane.

In addition, when viewed from the side surfaces, an extension line of the sub cutting edge clearance surface may be located on right side of an extension line that connects two opposing sub cutting edges based on a virtual center line passing through the center of the upper surfaces, in which the extension lines may form an acute angle.

In addition, the upper surfaces may include an upper flat surface including a single plane, a second main cutting edge rake surface extending from the second main cutting edge toward the upper flat surface, a first main cutting edge rake surface extending from the first main cutting edge toward the upper flat surface, a corner cutting edge rake surface extending from the corner cutting edge toward the upper flat surface, a sub cutting edge rake surface extending from the sub cutting edge toward the upper flat surface, and a sub cutting edge clearance surface adjacent to the sub cutting edge rake surface and rising from the sub cutting edge rake surface In addition, the upper flat surface may be formed lower than the lowest point of the second main cutting edge.

A cutting tool on which the cutting insert described above is mounted is characterized of being mounted on the cutting tool at a positive axial rake angle.

Effects of Invention

The cutting insert in the configuration described above according to the embodiment of the present disclosure is configured with a two-stage main cutting edge, that is, with the first main cutting edge and the second main cutting edge, and also implemented with the first main cutting edge as a straight line and the first main cutting edge clearance surface as a single plane, so that the first main cutting edge clearance surface is shifted toward the rotation axis of the cutting tool, thereby avoiding a contact with the right-angled inner wall of the workpiece at the upper right (outermost upper) of the cutting insert during cutting machining, and effectively performing multi-stage right-angled machining.

Meanwhile, it goes without saying that although not explicitly stated, the present disclosure includes other effects that can be expected from the configuration described above.

BEST MODE FOR EMBODYING INVENTION

Figure 1:
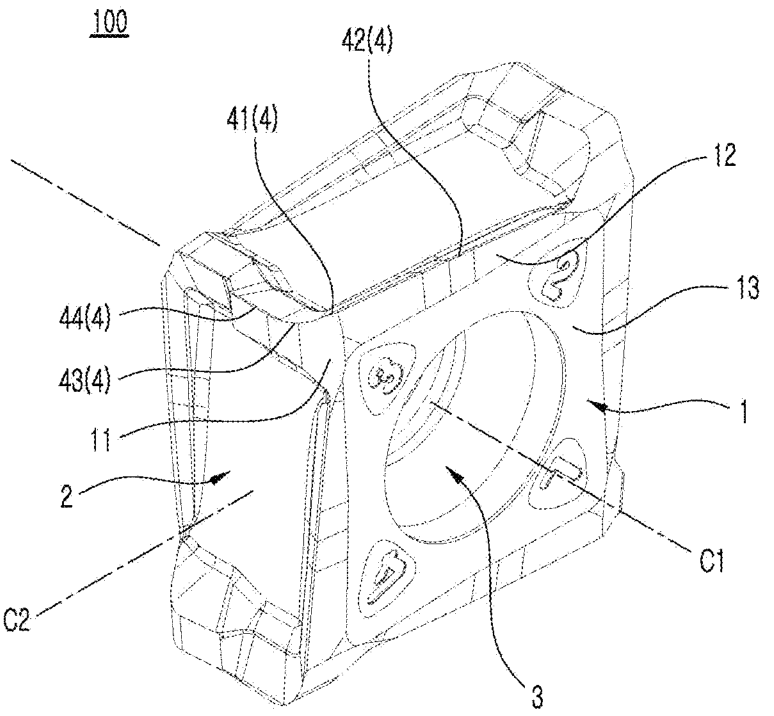
FIG. 1 is a perspective view of a cutting insert according to an embodiment of the present disclosure.
Figure 2:
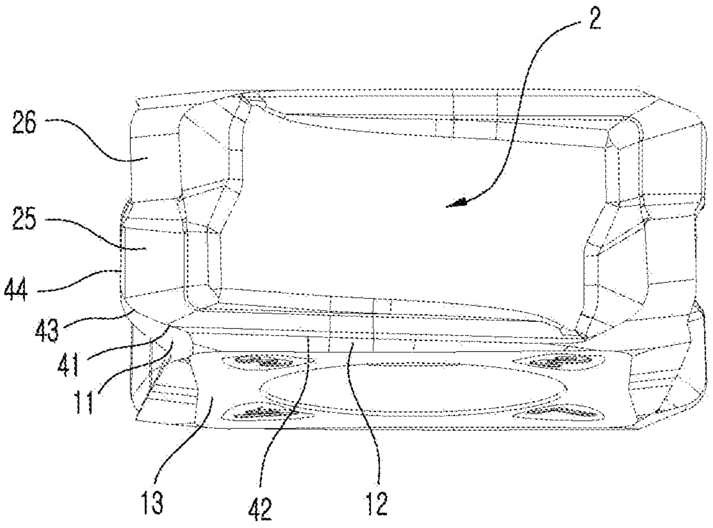
FIG. 2 is a perspective view of the cutting insert of FIG. 1 viewed from above.

Hereinafter, preferred embodiments of the present disclosure will be described in detail with reference to the accompanying drawings, which will be readily apparent to those skilled in the art to which the present disclosure pertains. However, the present disclosure can be implemented in various other different forms and should not be construed as being limited to certain examples described herein.

As shown in FIGS. 1 to 4, a cutting insert 100 according to an embodiment of the present disclosure is a so-called tangential type cutting insert 100 that can be used for right-angled machining, and includes two opposing side surfaces 1, four upper surfaces 2 in approximately rectangular shape extending between the two side surfaces 1, a fastening hole 3 penetrating the two side surfaces 1, and cutting edge portions 4 formed at positions where the side surfaces 1 and the upper surfaces 2 are connected to each other.

In addition, the cutting insert 100 is 180° rotationally symmetric about a virtual center line C1 that passes through the center of the fastening hole 3, and 180° rotationally symmetric about a virtual center line C2 that passes through the center of the upper surface 2.

Meanwhile, the cutting edge portions 4 include a first main cutting edge 41, a second main cutting edge 42, a corner cutting edge 43, and a sub cutting edge 44.

Figure 4:
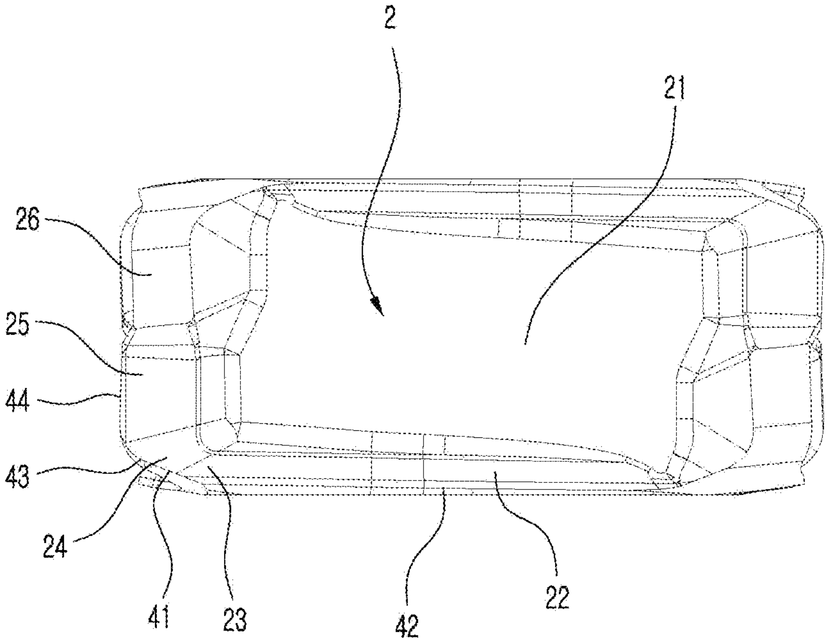
FIG. 4 is a diagram of the cutting insert of FIG. 1 viewed from above.

The second main cutting edge 42 is formed on the long side of the upper surface 2, as shown in FIG. 4.

The first main cutting edge 41 is connected to the second main cutting edge 42 at an angle, and the first main cutting edge 41 has a linear shape.

The corner cutting edge 43 is connected to the first main cutting edge 41 in a curved shape.

The sub cutting edge 44 is formed on the short side of the upper surface 2 and connected to the corner cutting edge 43.

Figure 3:
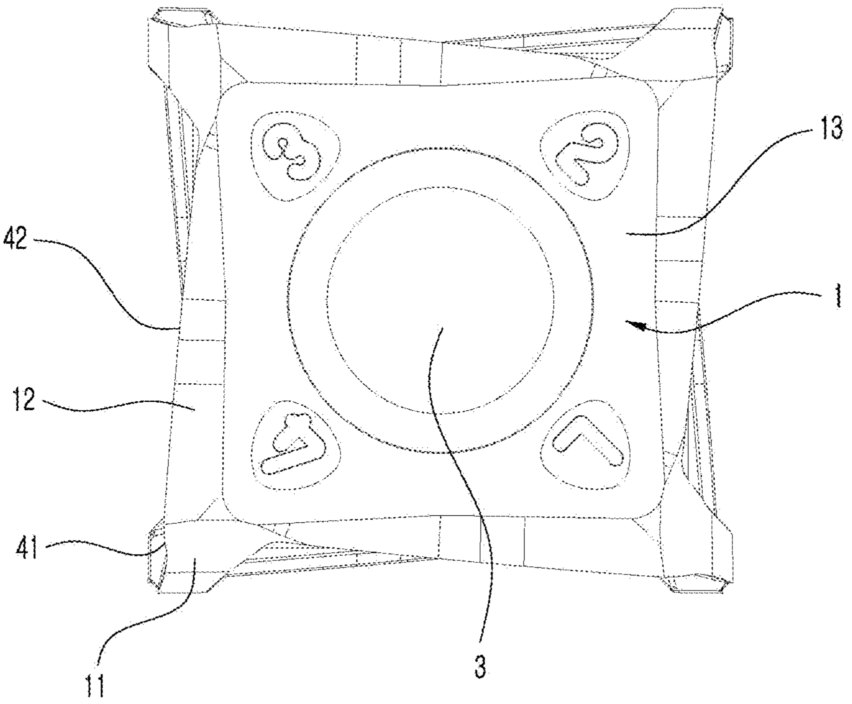
FIG. 3 is a diagram of the cutting insert of FIG. 1 viewed from the side.

As illustrated in FIG. 3, the side surface 1 includes a side flat surface 13, a second main cutting edge clearance surface 12, and a first main cutting edge clearance surface 11.

The side flat surface 13 includes a single plane and surrounds the fastening hole 3 into which a fastening bolt is inserted upon fastening to the cutting tool.

The second main cutting edge clearance surface 12 extends from the side flat surface 13 and is connected to the second main cutting edge 42.

The first main cutting edge clearance surface 11 extends from the side flat surface 13 and is connected to the first main cutting edge 42 while being in contact with the second main cutting edge clearance surface 12. In particular, the first main cutting edge clearance surface 11 includes a single plane.

As shown in FIG. 4, the upper surfaces 2 include an upper flat surface 21, a second main cutting edge rake surface 22, a first main cutting edge rake surface 23, a corner cutting edge rake surface 24, a sub cutting edge rake surface 25, and a sub cutting edge clearance surface 26, which form a single plane. For reference, the rake surface corresponds to a surface where the chips separated from the workpiece flow over during the machining of the workpiece.

The second main cutting edge rake surface 22 extends from the second main cutting edge 42 toward the upper flat surface 21.

The first main cutting edge rake surface 23 extends from the first main cutting edge 41 toward the upper flat surface 21.

The corner cutting edge rake surface 24 extends from the corner cutting edge 43 toward the upper flat surface 21.

The sub cutting edge rake surface 25 extends from the sub cutting edge 44 toward the upper flat surface 21.

The sub cutting edge clearance surface 26 is adjacent to the sub cutting edge rake surface 25 and rises from the sub cutting edge rake surface 25. That is, in FIG. 4, the sub cutting edge clearance surface 26 protrudes relatively farther than the sub cutting edge rake surface 25 in the direction out of the plane of the page.

Figure 5:
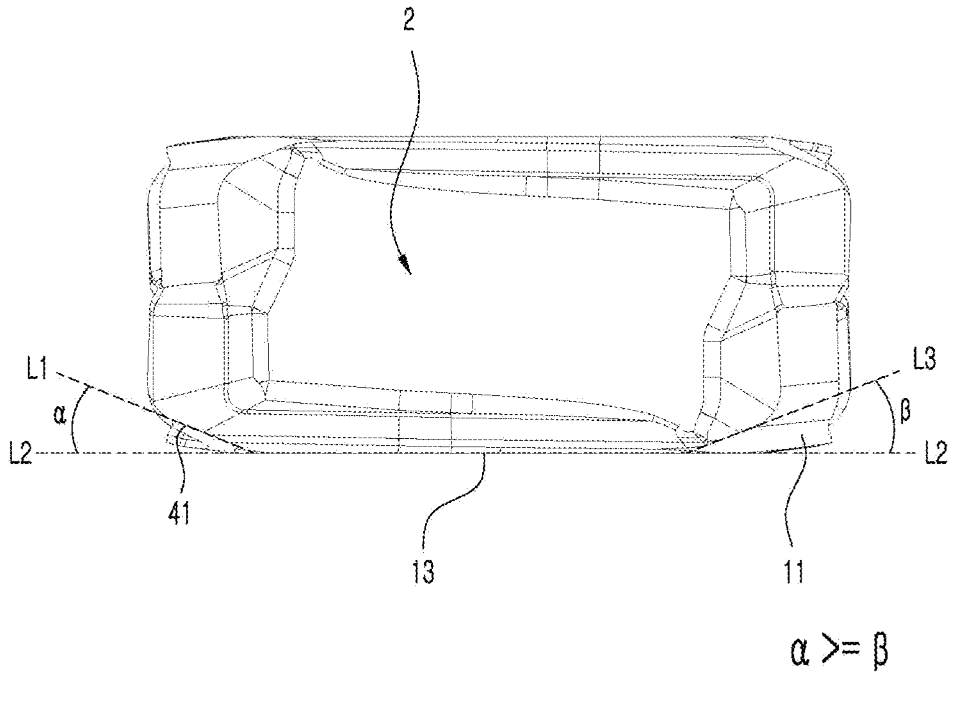
FIG. 5 is a diagram illustrating the relationship of a first main cutting edge and a first main cutting edge clearance surface to a side flat surface in FIG. 4.

As shown in FIG. 5, when the cutting insert 100 is viewed from the upper surface 2, an angle α formed by an extension line L1 of the first main cutting edge 41 and an extension line L2 of the side flat surface 13 is preferably greater than or equal to an angle β formed by an extension line L3 of a boundary line of the first main cutting edge clearance surface 11 and an extension line L2 of the side flat surface 13. If β>α, there is a problem that the rigidity of the first main cutting edge clearance surface 11 is lowered.

Figure 7A:
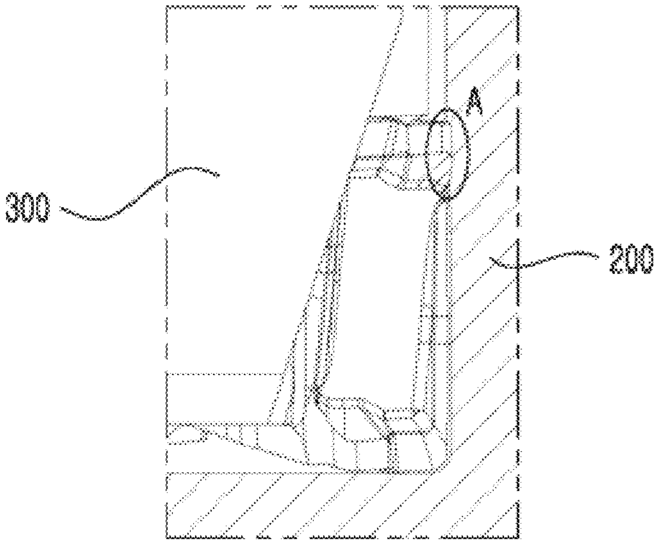
FIG. 7A is a schematic diagram showing a related cutting insert interfering with a vertical inner wall of the workpiece.
Figure 7B:
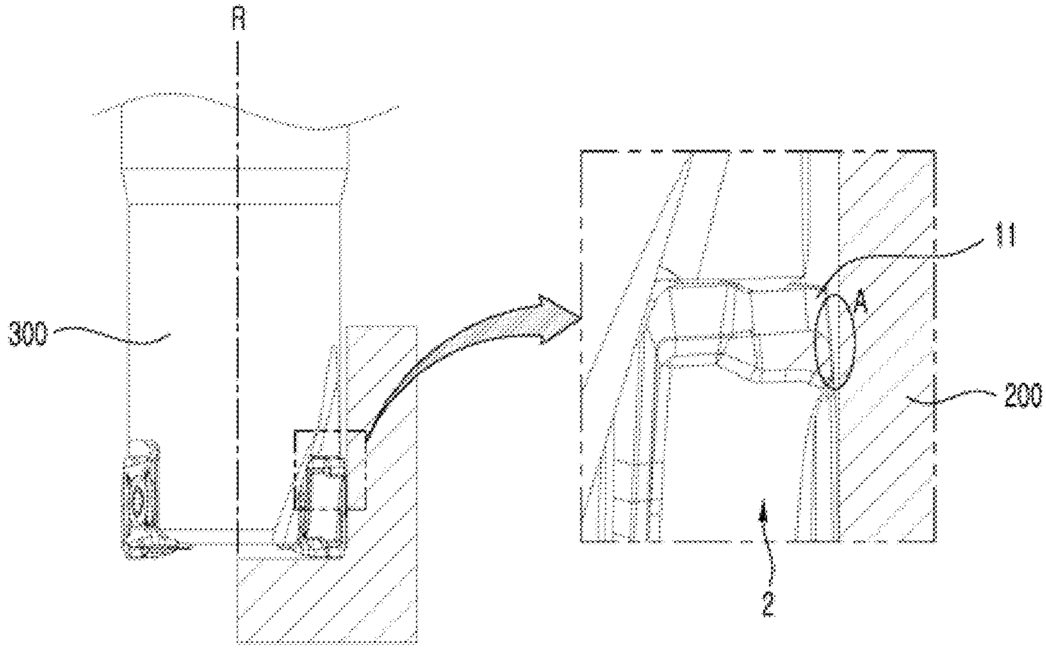
FIG. 7B is a schematic diagram showing the cutting insert not interfering with the vertical inner wall of the workpiece.

Based on this, as shown in FIG. 7B, the cutting insert 100 may be configured with a two-stage main cutting edge, that is, with the first main cutting edge 41 and the second main cutting edge 42, and may also be implemented with the first main cutting edge 41 as a straight line and the first main cutting edge clearance surface 11 formed on a single plane, so that the boundary line of the first main cutting edge clearance surface 11 is shifted toward the rotation axis R of the cutting tool 300, thereby avoiding a contact with the right-angled inner wall of the workpiece 200 at an upper right side A of the cutting insert during cutting machining, and effectively performing multi-stage right-angled machining. On the other hand, as shown in FIG. 7A, the related cutting insert does not have a configuration corresponding to the first main cutting edge 41 of the main cutting insert 100, and only has a round corner clearance surface, and in this case, the contact with the right-angled inner wall of the workpiece 200 occurs, making it impossible to perform a complete multi-stage right angle machining that does not involve workpiece re-machining.

Figure 6A:
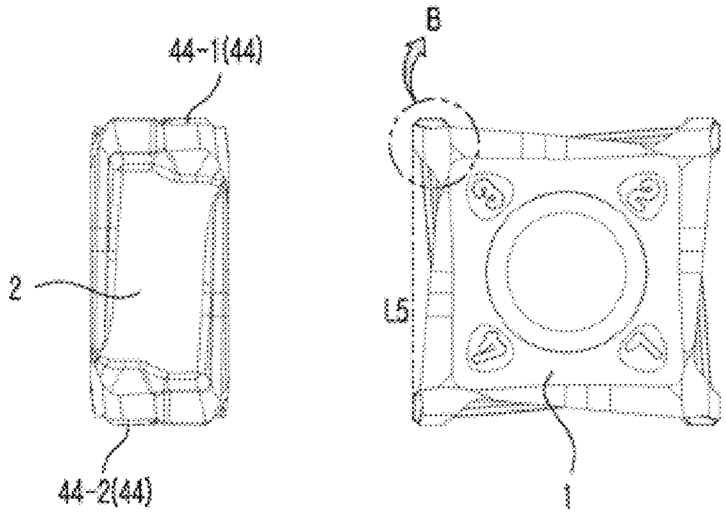
FIG. 6 is a view showing a sub cutting edge clearance surface formed as a positive surface in the cutting insert of FIG. 1.
Figure 6B:
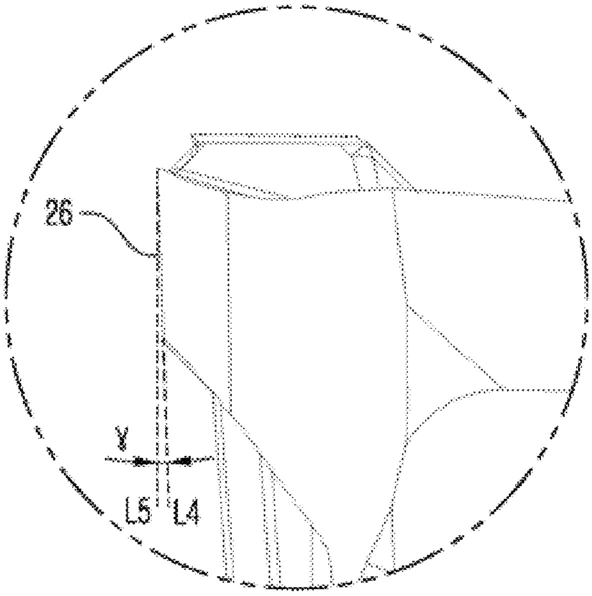

Meanwhile, as shown in FIG. 6, when the main cutting insert 100 is viewed from the side surface 1, the extension line L4 of the sub cutting edge clearance surface 26 is located on the right side (based on FIG. 6B) of an extension line L5 that connects the two opposing sub cutting edges 44-1 and 44-2 based on the center of the upper surfaces 2, and the sub cutting edge clearance surface 26 forms a so-called positive surface. That is, the extension line L5 and the extension line L4 form an acute angle γ.

Figure 8:
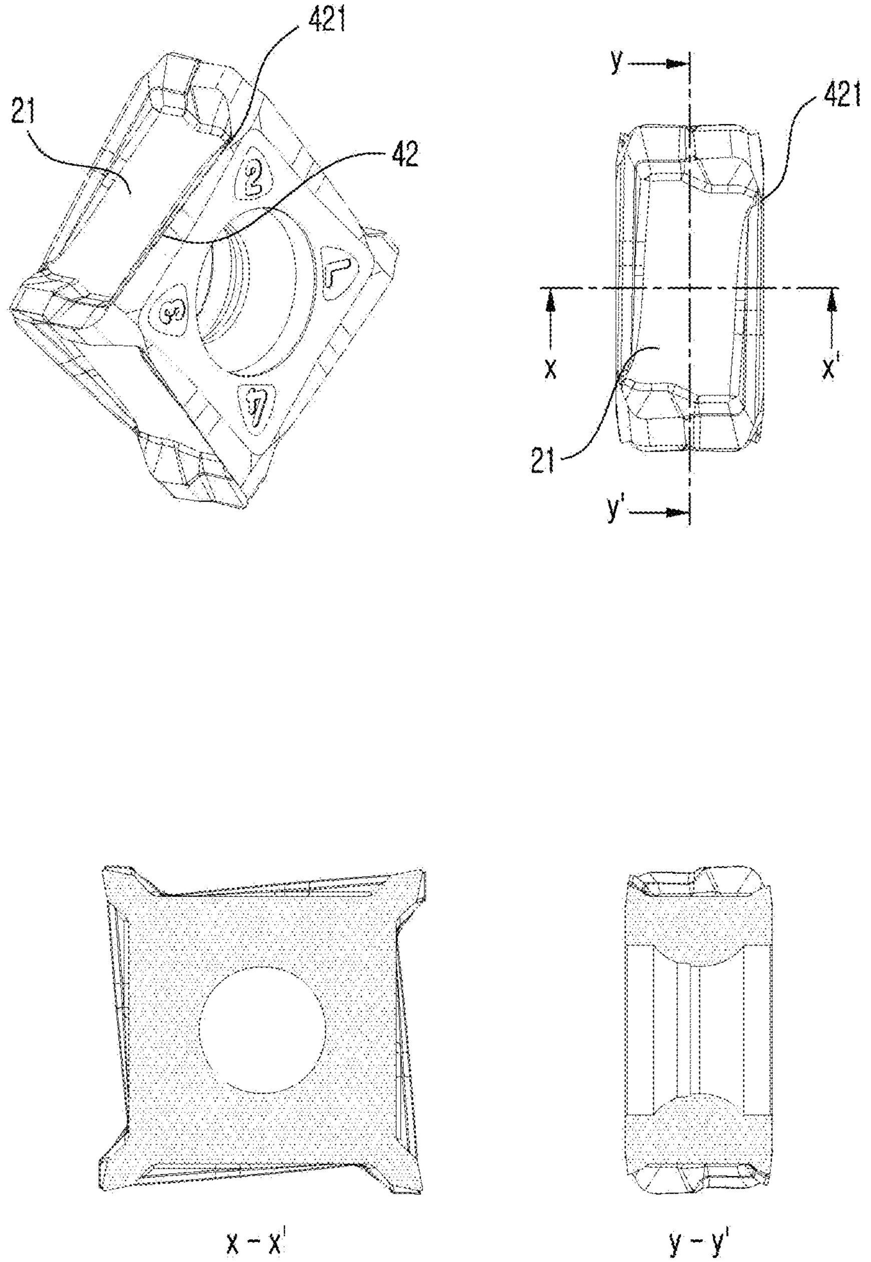
FIG. 8 is a diagram showing the relationship between an upper flat surface and a second main cutting edge in the cutting insert of FIG. 1.

In addition, as shown in FIG. 8, the upper flat surface (so-called boss surface) 21 of the main cutting insert 100 is formed lower than the lowest point 421 of the second main cutting edge 42. In addition, as described above, the upper flat surface 21 is a single plane. Therefore, the cutting insert 100 has good manufacturing properties and a large fastening surface (upper flat surface) for fastening to the cutting tool, ensuring good stability during multi-stage right angle machining.

Figure 9A:
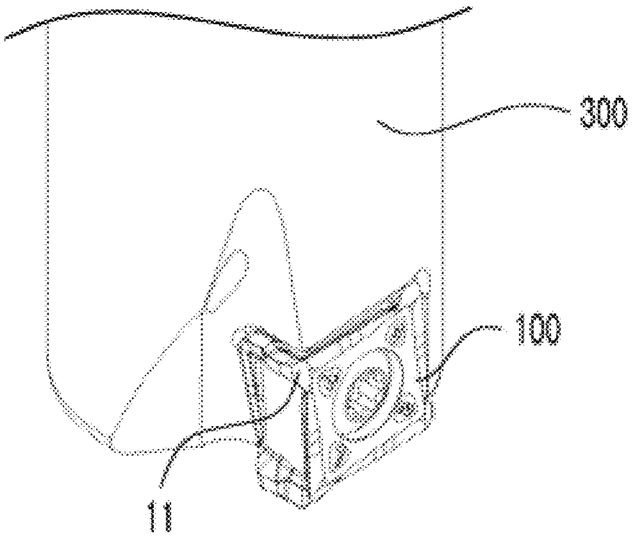
FIG. 9 shows the cutting insert of FIG. 1 mounted on a cutting tool.

Hereinafter, a cutting tool 300 equipped with the cutting insert 100 having the configuration described above according to one embodiment of the present disclosure will be briefly described with reference to FIGS. 9 and 10.

The cutting tool 300 includes a plurality of pocket parts 301 on which the cutting insert 100 is mounted.

The pocket part 301 includes upper seat parts 302 on which the two upper surfaces 2 of the cutting insert 100 are seated, respectively, and one side seat part 303 on which the side surface 1 of the cutting insert 100 is seated. The upper seat parts 302 and the side seat part 303 are formed on a single plane.

Figure 9B:
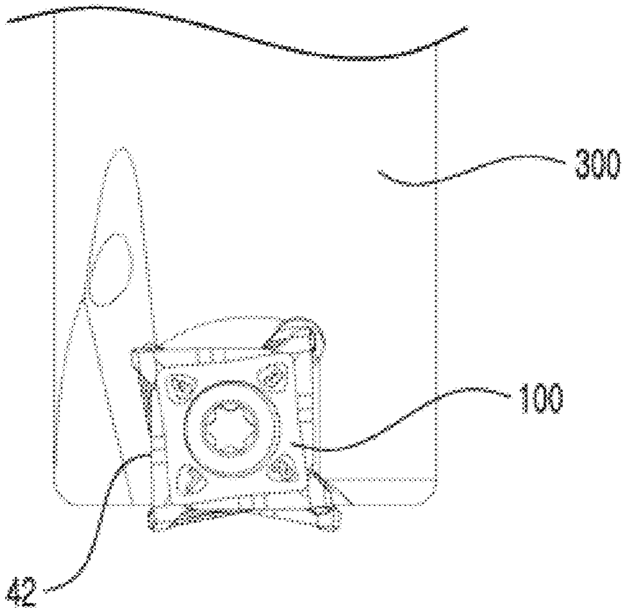
Figure 10A:
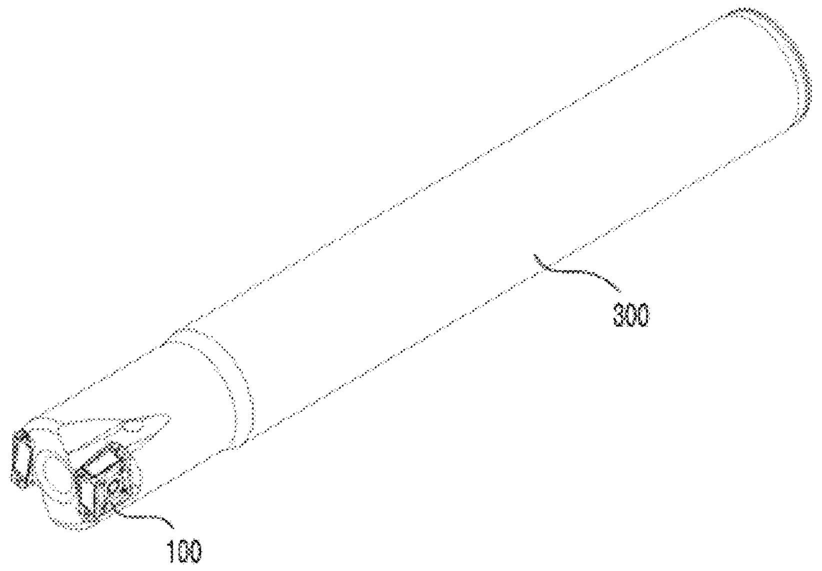
FIG. 10 shows a configuration of a pocket portion of the cutting tool of FIG. 9.
Figure 10B:
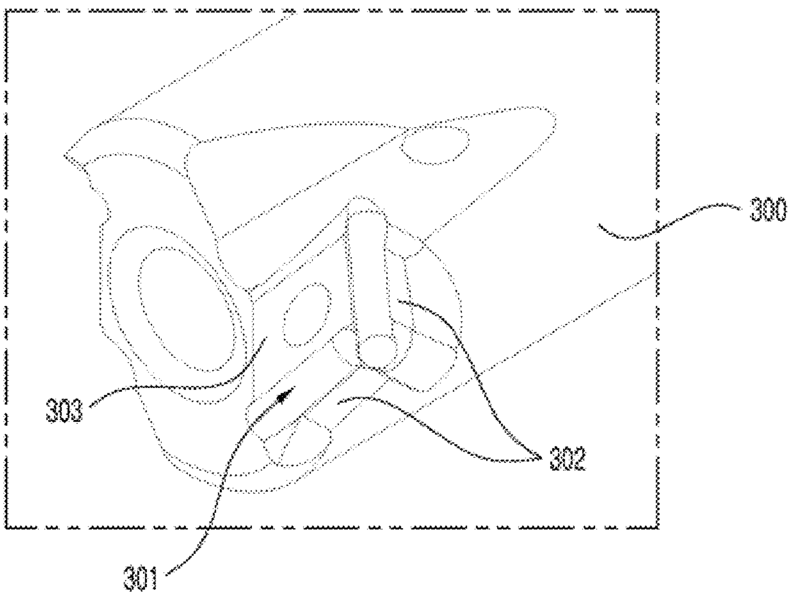
Figure 11:
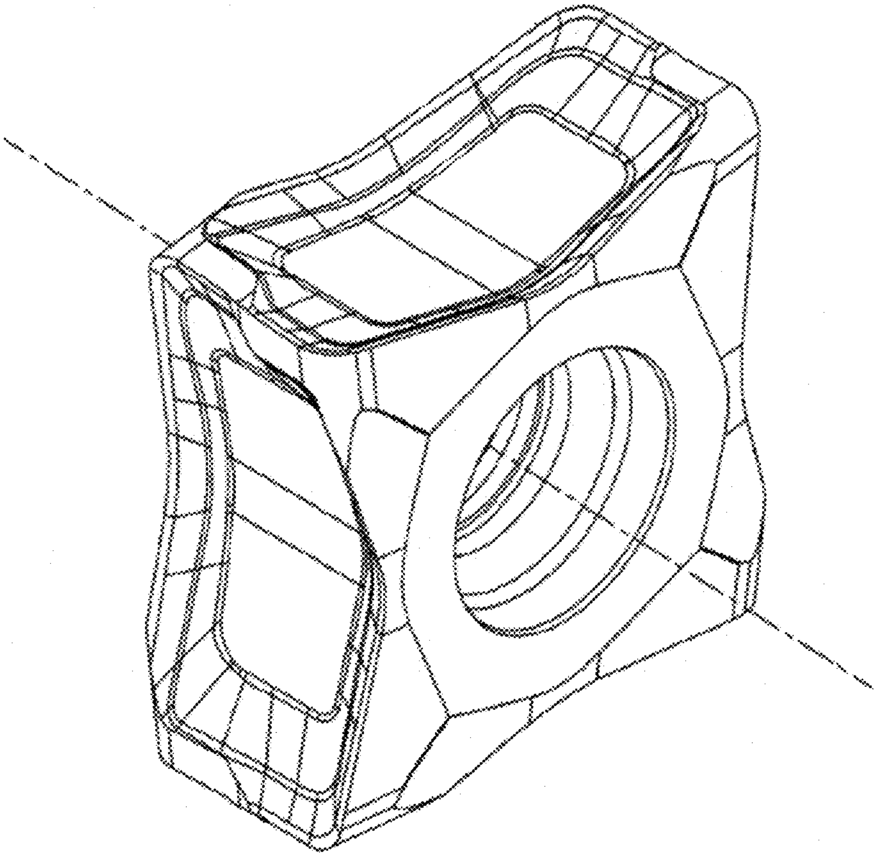
FIG. 11 Prior Art
FIGS. 11 to 13 illustrate prior art and show a related cutting insert.
Figure 12:
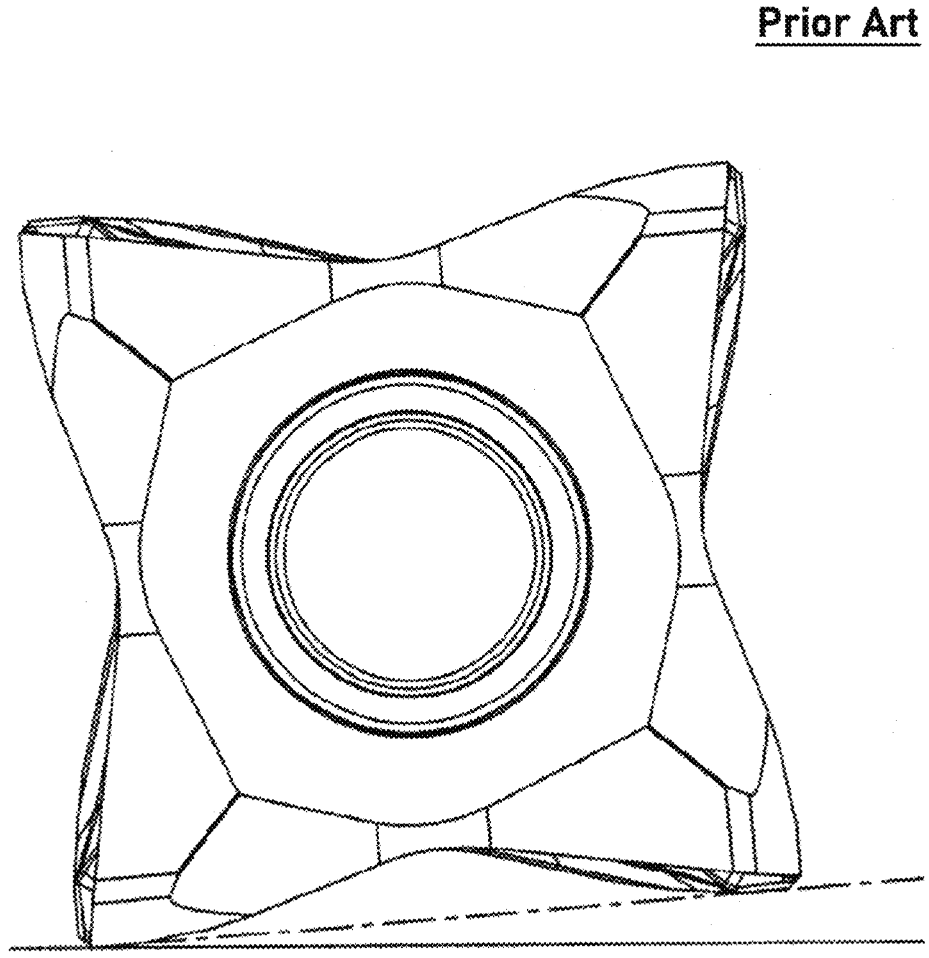
Figure 13:
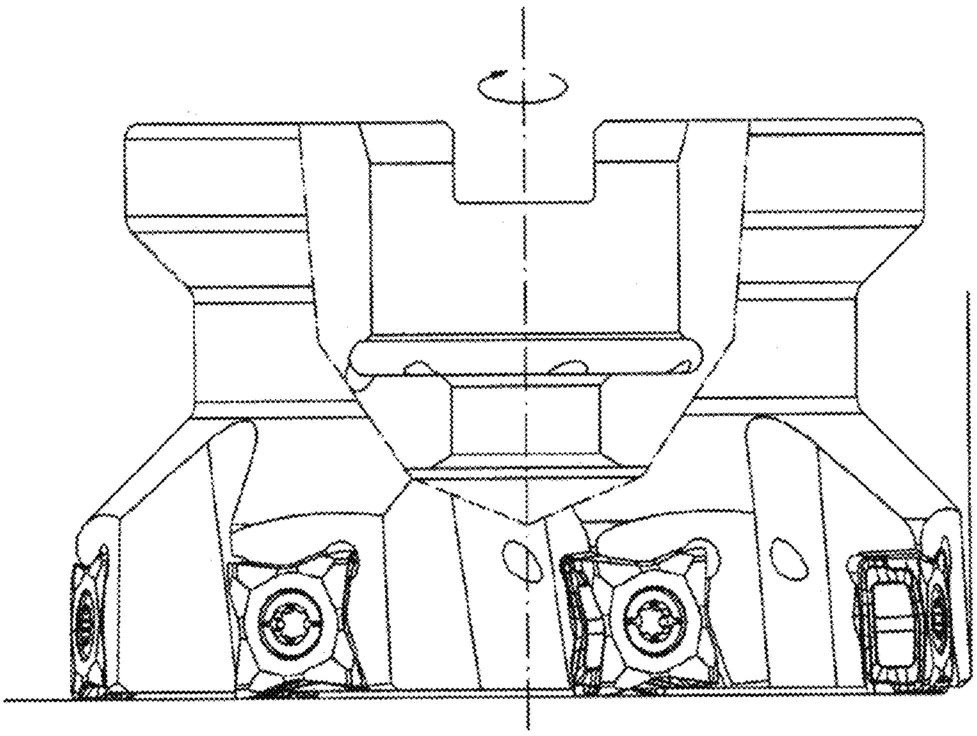

As shown in FIG. 9B, the cutting insert 100 is mounted on the cutting tool 300 at a positive axial rake angle.

Although the present disclosure has been described in connection with some examples herein, the present disclosure should not be limited to those examples only, and various other changes and modifications made by those skilled in the art from the basic concept of the disclosure are also within the scope of the claims appended herein.

INDUSTRIAL APPLICABILITY

The present disclosure can be used for a cutting tool for machining a workpiece.

The invention claimed is:

1. A cutting insert for right angle machining, comprising two opposing side surfaces, four rectangular upper surfaces extending between the two side surfaces, a fastening hole penetrating the two side surfaces, and cutting edge portions formed at positions where the side surfaces and the upper surfaces are connected to each other, wherein the cutting insert is 180° rotationally symmetric about a virtual center line passing through a center of the fastening hole, and 180° rotationally symmetric about a virtual center line passing through a center of the upper surfaces, the cutting edge portions comprise a second main cutting edge formed on long sides of the upper surfaces, a first main cutting edge connected to the second main cutting edge at an angle, a corner cutting edge connected to the first main cutting edge, and a sub cutting edge formed on short sides of the upper surfaces and connected to the corner cutting edge, the side surfaces comprise a side flat surface surrounding the fastening hole, a second main cutting edge clearance surface extending from the side flat surface and connected to the second main cutting edge, and a first main cutting edge clearance surface extending from the side flat surface and connected to the first main cutting edge, and connected to the second main cutting edge clearance surface at an angle, and when viewed from the upper surfaces, an angle formed by an extension line of the first main cutting edge and an extension line of the side flat surface is greater than or equal to an angle formed by an extension line of a boundary line of the first main cutting edge clearance surface and an extension line of the side flat surface.

2. The cutting insert according to claim 1, wherein the first main cutting edge is a straight line, and the first main cutting edge clearance surface is formed on a single plane.

3. A cutting tool on which the cutting insert of claim 1 is mounted, wherein the cutting insert is mounted on the cutting tool at a positive axial rake angle.

4. The cutting insert according to claim 1, wherein the upper surfaces comprise an upper flat surface including a single plane, a second main cutting edge rake surface extending from the second main cutting edge toward the upper flat surface, a first main cutting edge rake surface extending from the first main cutting edge toward the upper flat surface, a corner cutting edge rake surface extending from the corner cutting edge toward the upper flat surface, a sub cutting edge rake surface extending from the sub cutting edge toward the upper flat surface, and a sub cutting edge clearance surface adjacent to the sub cutting edge rake surface and rising from the sub cutting edge rake surface.

5. The cutting insert according to claim 4, wherein the upper flat surface is formed lower than a lowest point of the second main cutting edge.

6. The cutting insert according to claim 4, wherein, when viewed from the side surfaces, an extension line of the sub cutting edge clearance surface is located on right side of an extension line that connects two opposing sub cutting edges based on a virtual center line passing through the center of the upper surfaces, wherein the extension lines form an acute angle.

* * * * *